Figure 1:
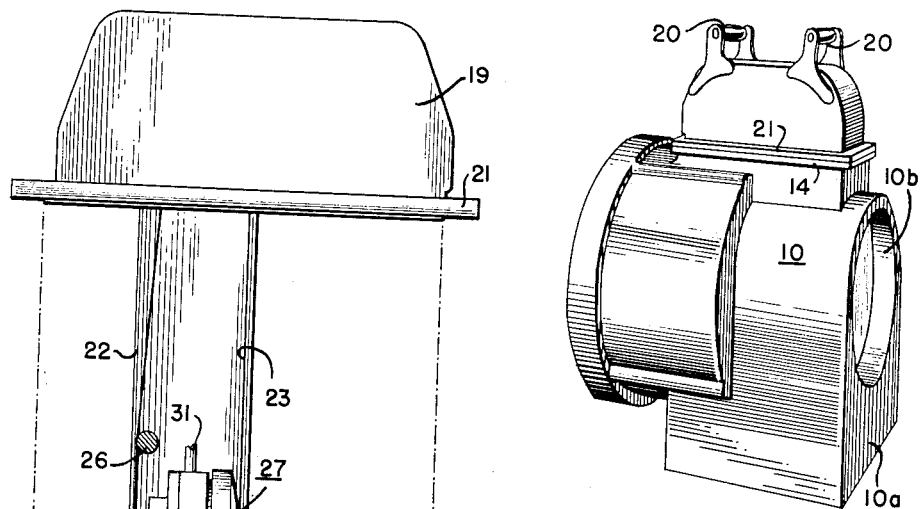

Jan. 24, 1956

N. KLING ET AL 2,731,893

FILM-POSITIONING APPARATUS FOR CAMERAS

Filed June 18, 1951

3 Sheets-Sheet 1

*INVENTORS*
*NELSON KLING*
*STEVE RONAI*

BY *Laurence B Dodds*

ATTORNEY

Jan. 24, 1956  N. KLING ET AL  2,731,893
FILM-POSITIONING APPARATUS FOR CAMERAS
Filed June 18, 1951

3 Sheets-Sheet 2

INVENTORS
NELSON KLING
STEVE RONAI
BY
Laurence B. Dodds
ATTORNEY

INVENTORS
NELSON KLING
STEVE RONAI
BY Laurence B Dodds
ATTORNEY

United States Patent Office 2,731,893
Patented Jan. 24, 1956

2,731,893
FILM-POSITIONING APPARATUS FOR CAMERAS

Nelson Kling, Roslyn, and Steve Ronai, Greenlawn, N. Y., assignors to Fairchild Camera and Instrument Corporation, a corporation of Delaware Application June 18, 1951, Serial No. 232,226

7 Claims. (Cl. 95—11)

This invention relates to film-positioning apparatus for cameras and, while it is of general application, it is particularly adapted for use in reflecting cameras to cause the film to conform accurately to the non-planar focal surface of the optical system of such a camera and the invention will be specifically illustrated and described in such an application.

It is well known that, for high definition pictures, it is necessary that the film accurately conform to the focal surface of the optical system of the camera. In a camera embodying a simple refracting optical system, the focal surface is usually a plane and the problem of positioning the film is relatively less difficult. However, in cameras using reflecting optical systems, the focal surface is usually non-planar, specifically spherical, and the problem is more troublesome.

In either the refracting or reflecting types of camera, it is necessary for optimum fidelity of reproduction both that the film be accurately positioned and that it conform accurately to the focal surface, whether plane or non-planar, without wrinkling or buckling. Heretofore it has been proposed to accomplish such positioning by compressing the film between two members having complementary surfaces of desired configuration. Since one such member must be glass, or equivalent, this ararngement has the disadvantage that it imposes two additional reflecting surfaces in the optical system. Moreover, such a member tends to become scratched by the passage of film, to collect dust, and otherwise to be unsatisfactory.

It has also been proposed to compress the film between one member having a surface of the desired configuration and a second aperture plate having a peripheral surface of complementary configuration. However, with this arrangement, for a given curvature the film tends to buckle as the picture size is increased or as the film thickness is decreased beyond certain limits. As a practical matter, such an arrangement imposes undesired limitations on the picture size for any given film.

It is an object of the present invention, therefore, to provide a new and improved film positioning apparatus for cameras which obviates one or more of the above-described disadvantages of prior apparatus of this type.

It is another object of the invention to provide a new and improved film-positioning apparatus for cameras by means of which the film may be accurately positioned and precisely conformed to the focal surface of the optical system of the camera.

In accordance with the invention, a film-positioning apparatus for a camera comprises a stationary support and a movable film-supporting member normally spaced from the support to provide for movement of a film therebetween and having a series of passages terminating in the face thereof adjacent an interposed film. The apparatus further includes a fluid conduit in communication with such passages and adapted to be connected to a source of fluid pressure less than that surrounding the film, a double-diaphragm differential pressure device in communication with the conduit and including a reciprocable actuating element, the film-supporting member being supported solely by the actuating element to be pressed thereby into registry with the stationary support, and a fluid connection between the conduit and the passages to cause an interposed film to adhere to and conform to the adjacent surface of the member.

For a better understanding of the present invention, together with other and further objects thereof, reference is had to the following description taken in connection with the accompanying drawings, while its scope will be pointed out in the appended claims.

Figure 2:
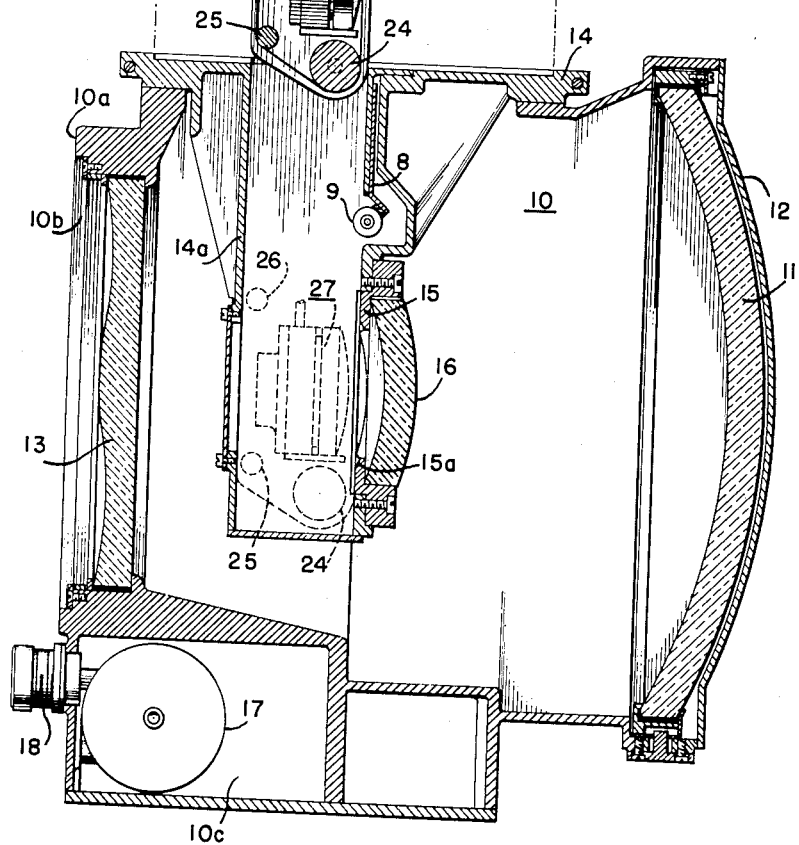
Figure 4:
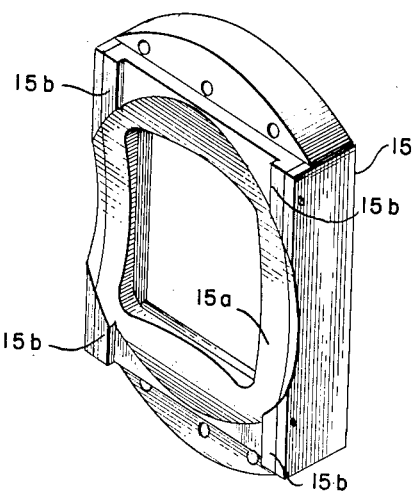
Figure 5:
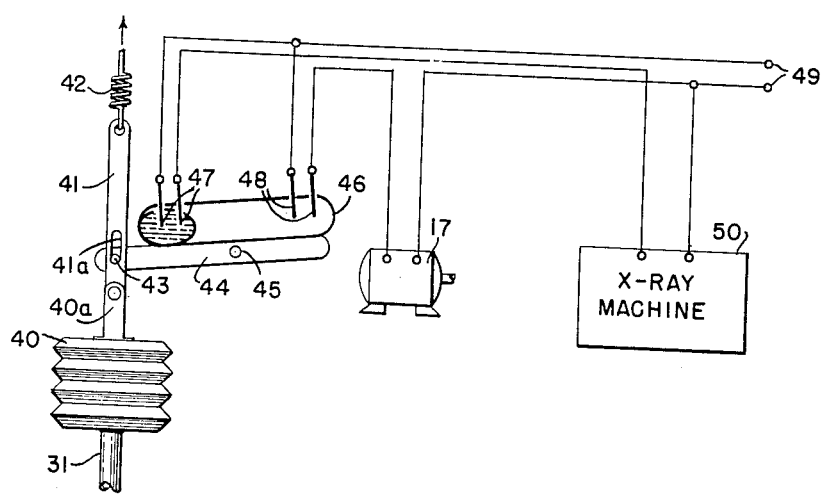
Figure 3A:
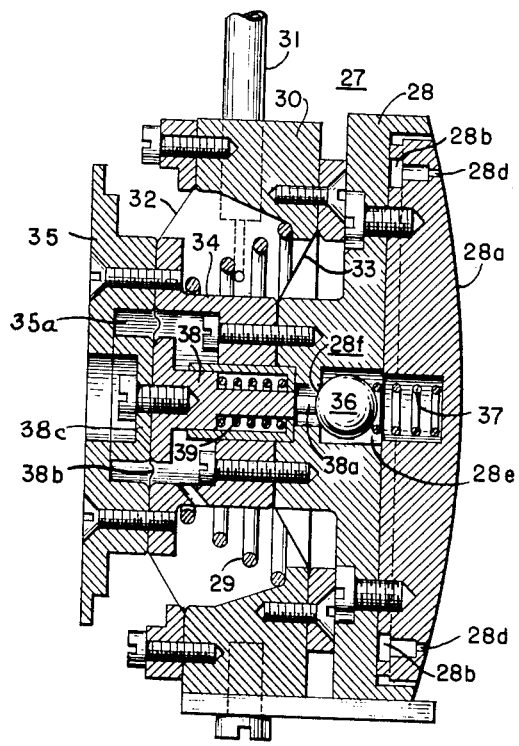
Figure 3B:
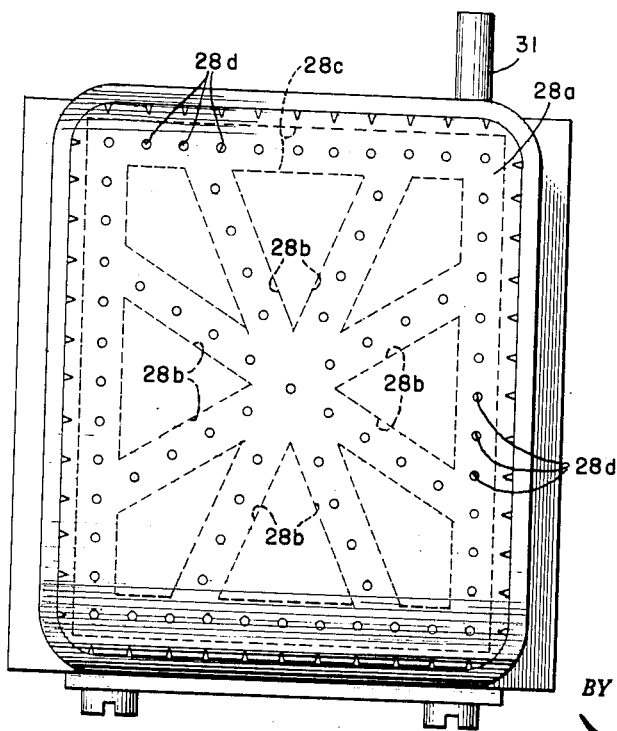

Referring now to the drawings, Fig. 1 is a perspective outline of a reflecting camera including a film-positioning apparatus embodying the invention; Fig. 2 is a cross-sectional view of the camera of Fig. 1 with the film cartridge and transfer mechanism withdrawn from the camera; Fig. 3a is a cross-sectional detail view of a vacuum-operated device comprising a portion of the film-positioning apparatus; Fig. 3b is an enlarged front view of a movable film-supporting member comprising an element of the film-positioning apparatus; Fig. 4 is an enlarged perspective view of the aperture plate of the camera of Figs. 1 and 2; while Fig. 5 is a schematic circuit diagram of a control arrangement suitable for use with the camera of Figs. 1 and 2.

Referring now to Figs. 1 and 2 of the drawings, there is represented a reflecting camera 10 of a type particularly adapted for X-ray photography. One face 10a of the camera is adapted to be disposed adjacent an X-ray fluoroscopic screen or other image to be photographed and is provided with a large aperture 10b through which the image is applied to the camera. At the opposite end of the camera housing there is disposed a spherical reflector 11 having a suitable outer protective cover 12. The reflector 11 is accurately and firmly positioned within the camera 10 in any suitable manner. Adjacent the aperture 10b is an aspherical correcting lens 13 which, as is well understood in the optical art, corrects for the spherical aberration of the reflector 11. As is well known, this type of a reflecting optical system has a non-planar, specifically a spherical, focal surface. The camera 10 is provided with an upper closure member 14 having an integral depending well 14a. The well 14a has a cross section as small as possible in order to minimize the obstruction in the optical system. One wall of the well 14a is disposed so that it lies approximately in the focal surface of the optical system and, at this point, there is provided a stationary film support in the form of an aperture plate 15 precisely and rigidly secured to the well 14a with its inner peripheral surface 15a, which is of a spherical configuration, lying precisely in the spherical focal surface of the optical system of the camera. Accurately and rigidly supported from the aperture plate 15 is a meniscus lens 16 forming a part of the reflecting optical system. The aperture plate 15 has a projection 15b at each corner thereof (Fig. 4), these projections serving as guides for the moving film. The camera 10 has a compartment 10c in its base in which is disposed a motor 17 energized through an electrical outlet 18. The motor 17 is connected through drive mechanism (not shown) to drive the film transport apparatus described hereinafter.

Co-operating with the well 14a is a removable film magazine 19 having handles 20, 20 and having an outer flange 21 adapted to seat precisely and firmly on the cover 14 of the camera and to be secured thereto by any suitable releasable fasteners, such as swing bolts, snap fasteners, etc. Depending from the magazine 19 is a frame comprising a pair of spaced plates 22 proportioned to fit snugly within the well 14a. The strip film 23 to be utilized in the camera travels down one side of the frame and over a series of idler rollers 24, 25, 26 and up the other side of frame 22. Disposed in the well 14a is a roller 9 biased by a leaf spring 8 into engagement with the film 23 when the magazine 19 is inserted in the well. Openings at the edge of the film leader, similar to conventional sprocket perforations, reciprocate roller 9 and actuate a conventional indicator, such as a signal-light switch (not shown) causing a signal light (not shown) to flash off and on, indicating the presence of the film leader in the well 14a. It will be understood that the supply spool for the film 23, as well as the take-up reel, are included in the magazine 19 together with the necessary control mechanisms and that the driving mechanism for the film 23 is powered from the motor 17 in the base of the camera. However, since these elements comprise no part of the present invention, they are not illustrated in detail.

Supported within the frame 22 is a movable film-supporting assembly 27 shown in cross-sectional detail in Fig. 3a. The assembly 27 is positioned within the frame 22 so that when the magazine 19 is inserted within the well 14a and secured to the cover 14, the movable member of the film-positioning apparatus is approximately in register with the aperture plate 15, 15, as shown in the dotted-line position in Fig. 2.

Referring now to Fig. 3a of the drawings, there is shown the movable film-supporting assembly 27 in detail. This assembly comprises a movable film-supporting member 28 which is normally spaced from the aperture plate 15a, as shown in Fig. 2, to provide for movement of the film 23 therebetween. This spaced relation may be established by means of a biasing spring 29 interposed between a stationary annular frame member 30 secured to the frame 22 and the movable member 28 and biasing the latter to the left, as shown in Fig. 3a. The movable member 28 has a face plate 28a secured thereto, the plate 28a having a series of passages terminating in the face thereof adjacent an interposed film. As shown more clearly in Fig. 3b, the element 28a is an apertured pressure plate having in its underface a series of radial channels 28b and an interconnecting peripheral channel 28c, each of these channels having a series of small apertures 28d extending from the several channels to the face of the plate adjacent the film. The several channels 28b, 28c connect with a central opening 28e in the member 28. The member 28 including the plate 28a is designed with a non-planar surface configuration corresponding to the focal surface of the camera lens system, in this case being spherical. The opening 28e of the member 28 is in communication with a fluid conduit or pipe 31 adapted to be connected to a source of pressure less than that surrounding the film 23 in the camera. Preferably the camera mechanism operates at atmospheric pressure and the conduit 31 is connected to a source of a relatively high vacuum.

The film-positioning apparatus of the invention includes means of pressing the member 28 into registry with the supporting aperture plate 15 and this means may be in the form of a fluid-operated actuating apparatus in communication with the conduit 31 and effective to press the member 28 into registry with the plate 15. As illustrated, this actuating apparatus comprises a vacuum-responsive double-diaphragm differential-pressure device including a pair of flexible diaphragms 32 and 33, the latter being of smaller effective area than the former. The member 28 is supported solely by these diaphragms which, as illustrated, are clamped between the member 28 and a pair of coaxial rings 34 and 35 secured to the member 28. The outer peripheries of diaphragms 32, 33 are clamped to frame member 30, forming a vacuum chamber between diaphragms 32 and 33 in communication with the conduit 31 as illustrated. This assembly 28, 32, 33, 34, 35 comprises a reciprocable actuating mechanism of which the film-supporting member 28 is a unitary part and by which it is pressed into registry with the aperture plate 15.

In the case of vacuum pumps of moderate capacity by which the conduit 31 would ordinarily be supplied, it is impossible to build up a high vacuum unless there is a substantial constriction somewhere in the fluid line. Therefore, to permit the building up of a vacuum in the system prior to the sealing of the apertures 28d of the plate 28a, there is provided means for limiting the initial fluid flow through these apertures. This may take the form of ball check valve 36 disposed in the opening 28e and biased by a spring 37 against a valve seat 28f in the bottom of the opening 28e. The ball valve 36 is disposed to be unseated by a plunger 38 having an extending pin 38a engaging the ball valve 36. The plunger 38 is actuated by an auxiliary diaphragm 38b subject to the same differential pressure as the diaphragms 32, 33, its motion being opposed by a biasing spring 39. Specifically, the outer periphery of diaphragm 38b is clamped between the rings 34 and 35 while its inner portion is clamped between an enlarged head of plunger 38 and a cup-shaped member 38c seated on the inner face of a cylindrical cavity 35a in ring 35 so that atmospheric pressure is effectively applied to the head of plunger 38 and, as member 38c unseats from the face of the cavity 35a, to the outer face of diaphragm 38b. If the capacity of the vacuum system is adequate, the check valve 36 and its operating mechanism may be replaced by a small orifice in the vacuum passage to the opening 28e.

It is believed that the operation of the film-positioning apparatus will be clear from the foregoing description. In brief, a magazine 19 properly loaded with film is lowered into the well 14a of the camera 10 and firmly secured in position thereto and the camera is mounted adjacent a fluoroscopic screen or other image to be photographed. It is assumed that the conduit 31 is not at this time connected to a source of vacuum. Under these conditions, the spring 29 biases the movable film-supporting member 28 away from the film to permit the passage of the film between the supporting members 15 and 28 without interference or rubbing and the check valve 36 is seated, thereby sealing the vacuum chamber formed by the diaphragms 32, 33 from the passages of the plate 28a. When the film has been transferred so that a desired portion is in registry with the aperture plate 15, the connection from a source of vacuum to the conduit 31 is established.

As the vacuum builds up in the chamber between the diaphragms 32 and 33, due to the fact that the effective area of diaphragm 32 is greater than that of diaphragm 33, there is a net differential force dependent upon the difference in area of these two diaphragms and the difference in pressures applied thereto and this force is such as to actuate the film-supporting member 28 to the right and firmly into registry with the spherical surface 15a of the aperture plate 15, tightly sealing the film against the aperture plate. This action takes place under a partial vacuum with the check valve 36 remaining seated. Under these conditions, the film 23 is accurately and firmly positioned in the focal surface of the optical system of the camera, thereby ensuring optimum definition of the image to be photographed.

As the vacuum increases, it becomes sufficient to actuate diaphragm 38b and plunger 38 to overpower spring 39 and actuate pin 38a to lift ball check valve 36, thus connecting the passages 28b, 28c and the apertures 28d to the vacuum chamber formed by diaphragms 32 and 33. The vacuum created at the face of the plate 28a then draws the adjacent film to the plate causing it to adhere thereto and to conform accurately to the non-planar configuration of the plate over its entire surface.

Obviously when the desired exposure has been taken, the vacuum applied to the conduit 31 is released and the movable film-supporting assembly returns to its initial inactive position, thereby permitting the film to be transferred for a subsequent exposure.

In Fig. 5 there is schematically represented a circuit controlling means for selectively conditioning the camera for exposure of a film or controlling the energization of the film transport motor. This arrangement includes a pressure capsule 40 connected to the vacuum conduit 31 and actuating a link 41 pivotally connected to an ear 40a attached to the movable end of the capsule 40. The link 41 may be biased by a spring 42 to oppose movement by the capsule 40. The link 41 has an elongated slot 41a which is engaged by a pin 43 of an arm 44 pivoted at 45. The arm 44 carries a suitable switching mechanism, for example, a mercury switch 46 having pairs of contacts 47 and 48 disposed in opposite ends thereof. The elements 44 and 46 may be normally in balance so that as the mercury of the switch shifts from one end of the switch to the other, the elements are biased to such position by the weight of the mercury.

The contacts 47 of the switch 46 are connected in series with the film transport motor 17 and a source of supply, such as conventional lighting circuit terminals 49. The contacts 48 of switch 46 are similarly connected in series with terminals 49 and an X-ray machine 50 with which the camera is adapted to co-operate. It will be clear from the foregoing description of Fig. 5 that, when vacuum is applied to the conduit 31, the capsule 40 is actuated to operate the switch assembly 44, 46 to close the contacts 47, completing the circuit to the X-ray machine 50. When the vacuum to the conduit 31 is released, the capsule 40 actuates the switch 46 to close its contacts 48 in series with the film transport motor 17; that is, the film transport motor can be operated only when the vacuum is released from the conduit 31 so that the film-positioning apparatus is actuated to an inoperative position by its biasing spring 29, thereby freeing the film 23 for movement. On the other hand, the X-ray machine may not be operated except when vacuum is applied to the conduit 31, so that the film to be exposed is properly engaged by the film-positioning apparatus, thereby avoiding wastage of film should it be exposed when it is not accurately positioned in the focal surface of the camera.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a camera, a film-positioning apparatus comprising: a stationary support; a movable film-supporting member normally spaced from said support to provide for movement of a film therebetween and having a series of passages terminating in the face thereof adjacent an interposed film; means for pressing said member into registry with said support; a fluid conduit in communication with said passages and adapted to be connected to a source of fluid pressure less than that surrounding said film to cause an interposed film to adhere to and conform to the adjacent surface of said member; a spring-biased check valve in the fluid connection to said passages for limiting the initial fluid flow through said passages; and fluid-actuated means responsive to the fluid pressure of a connected source for releasing said check valve when said fluid pressure falls below a predetermined value after said film is sealed to the periphery of said support.

2. In a camera, a film-positioning apparatus comprising: a stationary support; a movable film-supporting member normally spaced from said support to provide for movement of a film therebetween and having a series of passages terminating in the face thereof adjacent an interposed film; a fluid conduit adapted to be connected to a source of fluid pressure less than that surrounding said film; a double-diaphragm differential-pressure device including a low-pressure chamber in communication with said conduit, said device being effective to press said member into registry with said support; and a fluid connection between said chamber and said passages to cause an interposed film to adhere to and conform to the adjacent surface of said member.

3. In a camera, a film-positioning apparatus comprising: a stationary support; a movable film-supporting member normally spaced from said support to provide for movement of a film therebetween and having a series of passages terminating in the face thereof adjacent an interposed film; a fluid conduit adapted to be connected to a source of fluid pressure less than that surrounding said film; a double-diaphragm differential-pressure device in communication with said conduit and including a reciprocable actuating element, said member being supported solely by said actuating element to be pressed thereby into registry with said support; and a fluid connection between said conduit and said passages to cause an interposed film to adhere to and conform to the adjacent surface of said member.

4. In a camera having a film-transport motor, a film-positioning apparatus comprising: a stationary support; a movable film-supporting member normally spaced from said support to provide for movement of a film therebetween and having a series of passages terminating in the face thereof adjacent an interposed film; a fluid conduit adapted to be connected to a source of fluid pressure less than that surrounding said film; fluid-operated actuating apparatus in communication with said conduit and connected to press said member into registry with said support; a fluid conection between said conduit and said passages to cause an interposed film to adhere to and conform to the adjacent surface of said member; and means responsive to the pressure in said fluid conduit for controlling the exposure of a film and the energization of the film-transport motor.

5. In a camera having a film-transport motor, a film-positioning apparatus comprising: a stationary support; a movable film-supporting member normally spaced from said support to provide for movement of a film therebetween and having a series of passages terminating in the face thereof adjacent an interposed film; a fluid conduit adapted to be connected to a source of fluid pressure less than that surrounding said film; fluid-operated actuating apparatus in communication with said conduit and connected to press said member into registry with said support; a fluid connection between said conduit and said passages to cause an interposed film to adhere to and conform to the adjacent surface of said member; and a two-position switch responsive to the pressure in said fluid conduit for selectively conditioning the camera for exposure of a film or controlling the energization of the film-transport motor.

6. In a reflecting camera having a non-planar focal surface, a film-positioning apparatus comprising: a stationary aperture plate having a peripheral surface corresponding to said focal surface; a movable film-supporting member normally spaced from said support to provide for the movement of a film therebetween; said supporting member having a non-planar surface configuration corresponding to said focal surface and having a series of passages terminating in the face thereof adjacent an interposed film; a vacuum conduit; a double diaphragm vacuum-responsive actuating apparatus including a vacuum chamber in communication with said conduit and connected to press said member into registry with said aperture plate; and a fluid connection between said chamber and said passages and effective upon evacuation to cause an interposed film to adhere and to conform to the non-planar surface of said member.

7. In a reflecting camera having a spherical reflector and a spherical focal surface, a film-positioning apparatus comprising: a stationary aperture plate having a spherical peripheral surface; a movable film-supporting member normally spaced from said support to provide for the movement of a film therebetween; said supporting member having a spherical surface and having a series of passages terminating in the face thereof adjacent an interposed film; a vacuum conduit; a double diaphragm vacuum-responsive actuating apparatus in communication with said conduit and including a reciprocable actuating element, said member being supported by said actuating element to be pressed thereby into registry with said aperture plate; and a fluid connection between said conduit and said passages and effective upon evacuation to cause an interposed film to adhere and to conform to the non-planar surface of said member.

References Cited in the file of this patent

UNITED STATES PATENTS

| Number | Name | Date |
|---|---|---|
| 1,082,678 | Casler | Dec. 30, 1913 |
| 1,309,798 | Folmer | July 15, 1919 |
| 1,443,433 | Rockstroh | Jan. 30, 1923 |
| 1,936,923 | Traenkle | Nov. 28, 1933 |
| 2,049,041 | Berggren | July 28, 1936 |
| 2,283,788 | Briechle et al. | May 19, 1942 |
| 2,333,835 | Wangerin | Nov. 9, 1943 |
| 2,528,308 | Helm | Oct. 31, 1950 |
| 2,596,222 | Doyle et al. | May 13, 1952 |

FOREIGN PATENTS

| Number | Country | Date |
|---|---|---|
| 849,283 | France | Aug. 11, 1939 |